UNITED STATES PATENT OFFICE.

ALFRED P. MERRILL AND JOHN EASTWOOD, OF SOCORRO, TERRITORY OF NEW MEXICO.

DENTIFRICE.

SPECIFICATION forming part of Letters Patent No. 284,751, dated September 11, 1883.

Application filed March 24, 1883. (No specimens.)

*To all whom it may concern:*

Be it known that we, ALFRED P. MERRILL and JOHN EASTWOOD, citizens of the United States, residing at Socorro, in the county of Socorro and Territory of New Mexico, have invented certain new and useful Improvements in Dentifrice or Tooth-Powder; and we do hereby declare the following to be a full, clear, and exact description of the invention, such as will enable others skilled in the art to which it appertains to make and use the same.

The object of our invention or discovery is a new substance for dentifrice or tooth-powder for saving the natural teeth, all as will be hereinafter fully described, and set forth in the claim hereto annexed.

Our discovery and preparation is made from the root of a plant indigenous to the southwestern States and Territories, termed "amole" or "soap-weed," and the process of preparing it for the market is as follows: After obtaining the root, the bark is separated therefrom while green, then the root thoroughly dried and reduced to a powder by a grinding or crushing machine, and the fiber subsequently separated from the powder by screens or other means, which powder is subsequently deoderized and scented to better prepare it for the market.

Of course both the bark and the interior of the root may be used, if desired.

What we claim, and desire to secure by Letters Patent, is—

As a new article of manufacture, the herein-described dentifrice or tooth-powder, consisting of the root of amole or soap-weed reduced to a powder, substantially as specified.

In testimony whereof we affix our signatures in presence of two witnesses.

ALFRED P. MERRILL.
    JOHN EASTWOOD.

Witnesses:
 GEO. L. BROWN,
 EDWIN N. BUMBAUGH.